(12) United States Patent
Chen et al.

(10) Patent No.: US 7,631,935 B2
(45) Date of Patent: Dec. 15, 2009

(54) CHILD CAR SEAT DEVICE WITH WING COMPONENTS

(75) Inventors: Shun-Min Chen, Taipei (TW); Jianqun Li, Taipei (TW)

(73) Assignee: Wonderland Nurserygoods Co., Ltd., Taipei (TW)

( * ) Notice: Subject to any disclaimer, the term of this patent is extended or adjusted under 35 U.S.C. 154(b) by 369 days.

(21) Appl. No.: 11/495,728

(22) Filed: Jul. 31, 2006

(65) Prior Publication Data
US 2007/0228792 A1    Oct. 4, 2007

(30) Foreign Application Priority Data
Apr. 4, 2006   (CN) .................... 2006 2 0112599 U

(51) Int. Cl.
*A47C 7/14* (2006.01)
(52) U.S. Cl. ............... 297/284.9; 297/406; 297/391
(58) Field of Classification Search .......... 297/408, 297/410, 409, 406, 407, 250.1, 391; 403/24
See application file for complete search history.

(56) References Cited

U.S. PATENT DOCUMENTS 4,370,000 A * 1/1983 Kazaoka et al. .......... 297/284.9
6,092,872 A * 7/2000 Beaulieu .................. 297/284.9
6,467,846 B2 * 10/2002 Clough .................... 297/410
6,601,804 B2 * 8/2003 Bisch ...................... 248/118
2004/0007910 A1 * 1/2004 Skelly ..................... 297/406

FOREIGN PATENT DOCUMENTS

DE         297 12 497 U1     9/1997
DE         102 15 058 C1     7/2003
DE      20 2005 011 742 U1   11/2005

* cited by examiner

*Primary Examiner*—David Dunn
*Assistant Examiner*—Erika Garrett
(74) *Attorney, Agent, or Firm*—Bacon & Thomas, PLLC

(57) ABSTRACT

A child car seat device with wing components includes a seat assembly, a backrest assembly and a headrest assembly, which are each connected together. The headrest assembly includes a headrest body, two headrest wing components, and two pivots passing through the headrest body and headrest wing components. Each pivot is retained by a fastener or a tab extending from the headrest wing component. The headrest body has a plurality of grooves and the headrest wing component has a rib. An angle defined between the headrest wing component and the headrest body can be changed by engaging the rib within different grooves. The headrest body has a stopper so that the headrest wing component cannot be pivotally rotated further outwards when it abuts against the stopper. The structures of the backrest assembly are similar to those of the headrest assembly. In addition, the seat device may be provided with the headrest wing components and/or backrest wing components.

16 Claims, 18 Drawing Sheets

CHILD CAR SEAT DEVICE WITH WING COMPONENTS

FIELD OF THE INVENTION

The present invention relates generally to a child car seat device, and more particularly to a child car seat device having headrest wing and/or backrest wing.

BACKGROUND OF THE INVENTION

In order to meet the demands of users, the headrest wings 14 of child car seat device 1 is adjustable. As shown in FIG. 1, the conventional headrest wings 14 are adjusted by operating knob 11 to slide along channel 12 and then to facilitate link 13.

However, the mechanism in above prior art, including the knob 11 and link 13, is complicated so that the cost for manufacturing and assembling the mechanism is high. In addition, there are no backrest wings in the conventional child car seat device 1 such that the body of the child therein is not under protection.

SUMMARY OF THE INVENTION

Accordingly, the present invention relates to a child car seat device with wing components to obviate one or more of the problems due to the limitations and disadvantages encountered in the prior art.

One object of the present invention is to provide a child car seat device with wing components, whose structure is simple.

Another object of the present invention is to provide a child car seat device with wing components, whose cost for manufacture and assembly is low.

Yet another object of the present invention is to provide a child car seat device with wing components, which can sufficiently protect the head of the child.

An object of the present invention is to provide a child car seat device with wing components, which can further sufficiently protect the body of the child.

Additional features and advantages of the invention will be set forth in the description which follows, and in portion will be apparent from the description, or may be learned by practice of the invention. The objectives and advantages of the invention will be realized and attained by the structure as particularly set forth in the written description and claims as well as illustrated in the appended drawings.

To achieve these and other advantages and according to the purpose of the present invention, as embodied and broadly described, a seat device comprises a seat assembly, a backrest assembly connected with the seat assembly, and a headrest assembly connected with the backrest. The headrest assembly includes: a headrest body having a plurality of first engaging portions; a headrest wing component having a second engaging portion, the second engaging portion being engaged with one of the first engaging portions such that a first angle is defined between the headrest wing component and the headrest body; and a first pivot being received within the headrest wing component and the headrest body by which the headrest wing component and the headrest body are pivotally connected; wherein the first angle can be altered by selectively engaging the second engaging portion with one of the first engaging portions.

Another aspect of the present invention is to provide a seat device comprising a seat assembly and a backrest assembly connected with the seat assembly. The backrest assembly comprises: a backrest body having a plurality of third engaging portions; a backrest wing component having a fourth engaging portion, the fourth engaging portion being engaged with one of the third engaging portions such that a second angle is defined between the backrest wing component and the backrest body; and a second pivot being received within the backrest wing component and the backrest body by which the backrest wing component and the backrest body are pivotally connected; wherein the second angle can be altered by selectively engaging the fourth engaging portion with one of the third engaging portions.

Moreover, the headrest body has a first pivoting block and a first hole through the first pivoting block; the headrest wing component has a second pivoting block and a second hole through the second pivoting block; the first pivot is received in the first hole and the second hole.

Additionally, the first engaging portions are a plurality of grooves on the first pivoting block, and the second engaging portion is a rib adjacent to the second pivoting block.

It is another preferred feature that the headrest body further has two first slots on the first pivoting block such that an area between the first slots are resiliently deformable, and the first engaging portions are formed on the area.

It is preferred that the headrest wing component further has a first tab, which extends from an inner surface of the second pivoting block to a region above the second hole for retaining the first pivot.

It is preferred that the first tab inclines with an axis of the second hole, and a lower section of the first tab is separated from the inner surface of the second pivoting block.

It is preferred that the headrest wing component further has a first opening formed on a top surface of the second pivoting block, and a diameter of the first opening is larger than that of the first pivot.

It is preferred that the headrest assembly further includes a first fastener, the first pivot has a first recess, and the first fastener is engaged in the first recess.

It is preferred that the headrest body has a first stopper, and the first angle is a maximum when the first stopper contacts with the second pivoting block.

It is preferred that the headrest wing component further has a first cover for covering a gap defined between the headrest wing component and the headrest body.

It is preferred that the backrest body has a third pivoting block and a third hole through the third pivoting block; the backrest wing component has a fourth pivoting block and a fourth hole through the fourth pivoting block; the second pivot is received in the third hole and the fourth hole.

It is preferred that the third engaging portions are a plurality of grooves on the third pivoting block, and the fourth engaging portion is a rib adjacent to the fourth pivoting block.

It is preferred that the backrest body further has two second slots on the third pivoting block such that an area between the second slots are resiliently deformable, and the third engaging portions are formed on the area.

Yet another aspect of the present invention is to provide a child car seat device which comprises: a rest body having a plurality of first engaging portions at two opposite sides thereof; and a pair of wing components pivotally connected to the opposite sides of the rest body respectively, each of the wing components having a second engaging portion being engaged with one of the first engaging portions such that an angle is defined between the rest body and the each of the wing components; wherein the angle can be altered by engaging the second engaging portion selectively with the one of the first engaging portions.

It is preferred that the rest body further has a first pivoting block at each of the opposite sides thereof on which the first engaging portions are formed, the each of the wing components further has a second pivoting block on which the second engaging portion is formed, the second pivoting block is coupled with the first pivoting block, and a pivot is received in both the first pivoting block and the second pivoting block.

It is to be understood that both the foregoing general description and the following detailed description are exemplary and explanatory and are intended to provide a further non-limiting explanation of the invention as claimed.

BRIEF DESCRIPTION OF THE DRAWINGS

The accompanying drawings, which are included to provide a further understanding of the invention and constitute a portion of the specification, illustrate embodiments of the invention and together with the description serve to explain the principle of the invention. In the drawings.

DETAILED DESCRIPTION OF THE INVENTION

The First Preferred Embodiment

Figure 1:
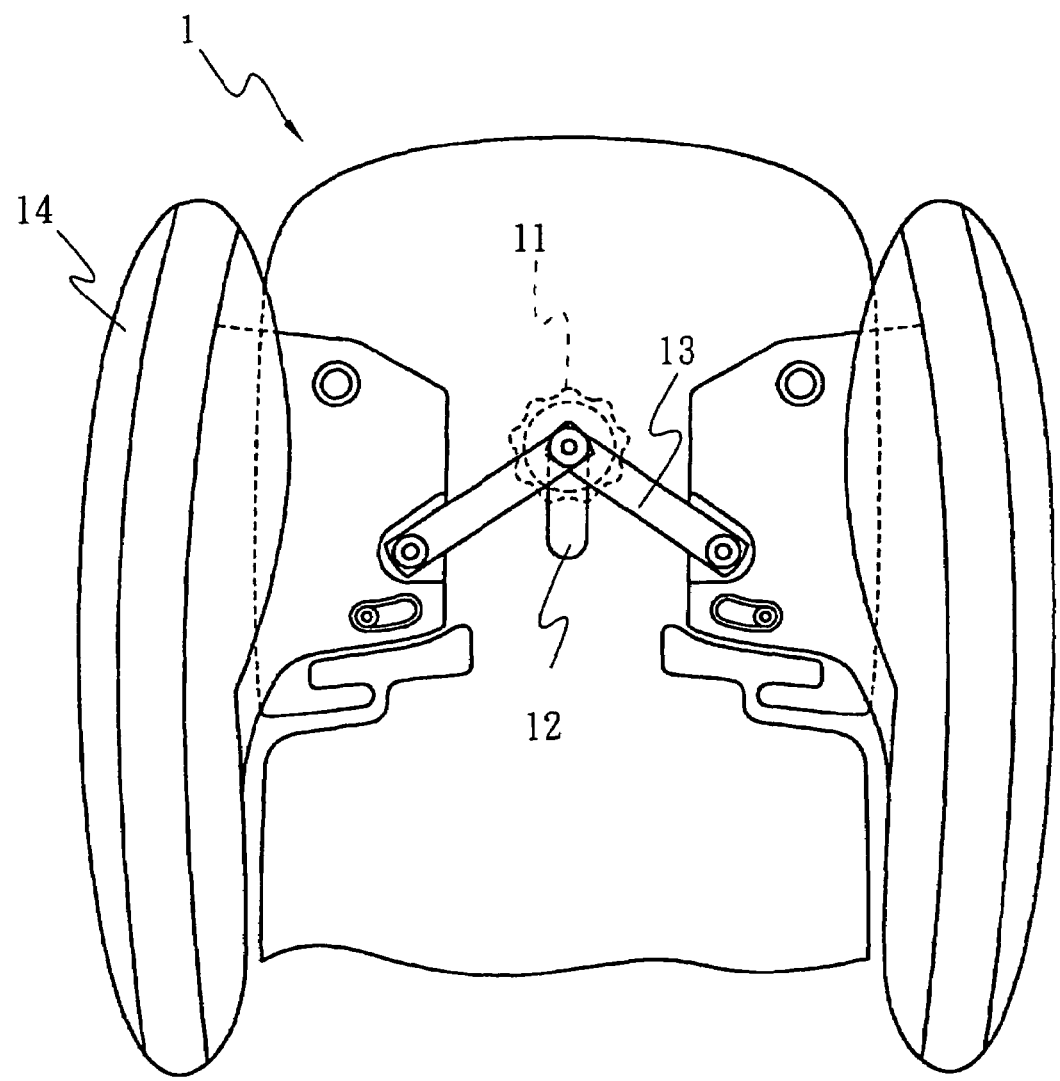
FIG. 1 is a partially perspective view illustrating a conventional child car seat device with headrest wings.
Figure 2:
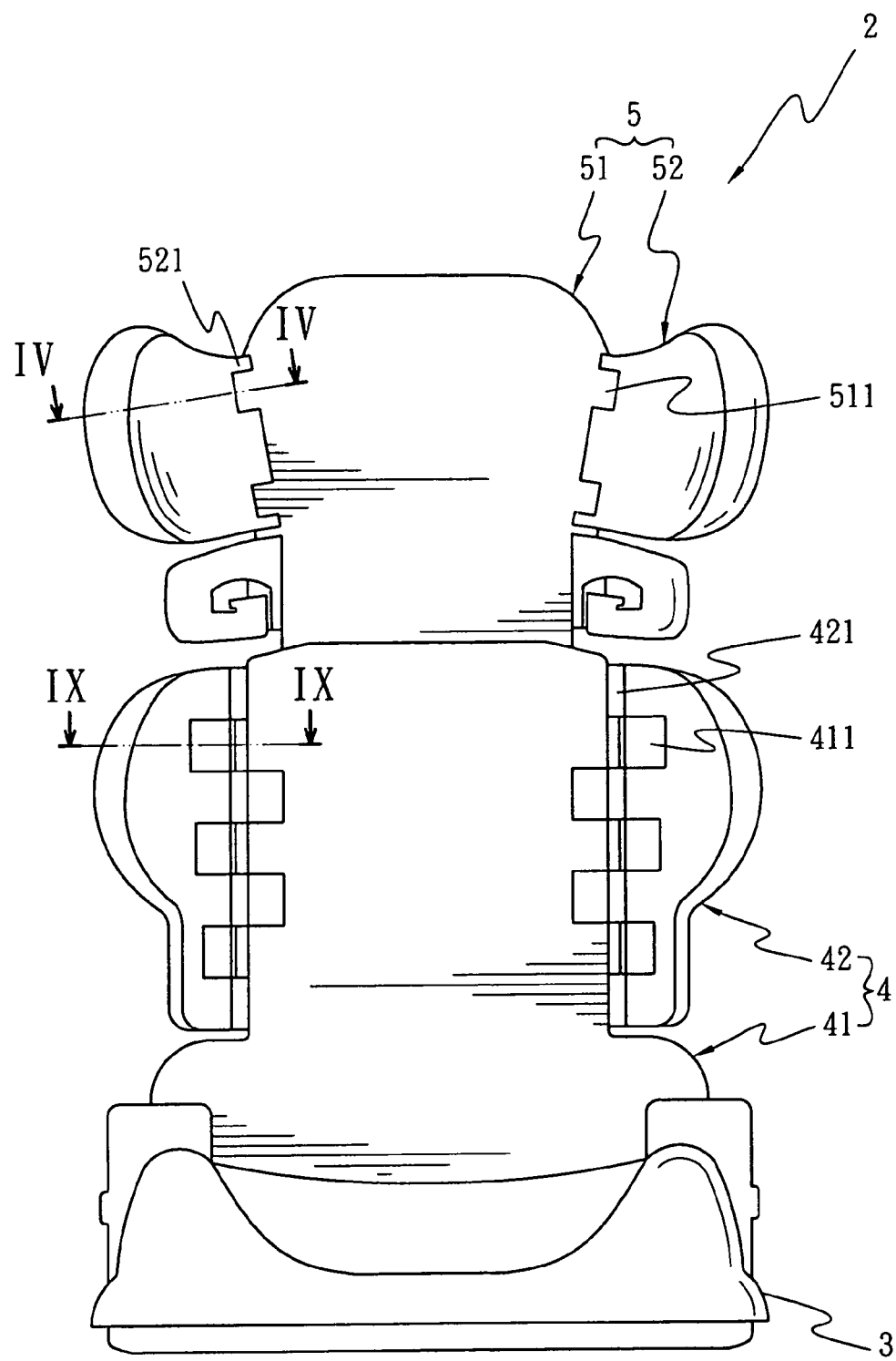
FIG. 2 is an assembled perspective view illustrating the child car seat device with wing components according the present application.

As shown in FIG. 2, the first preferred embodiment of the child car seat device 2 with wing components according to the present invention comprises a seat assembly 3, a backrest assembly 4 pivotally connected or coupled with the seat assembly 3 at one end thereof, a headrest assembly 5 slidably coupled with the backrest assembly 4 at another end thereof.

Headrest Assembly

Figure 3:
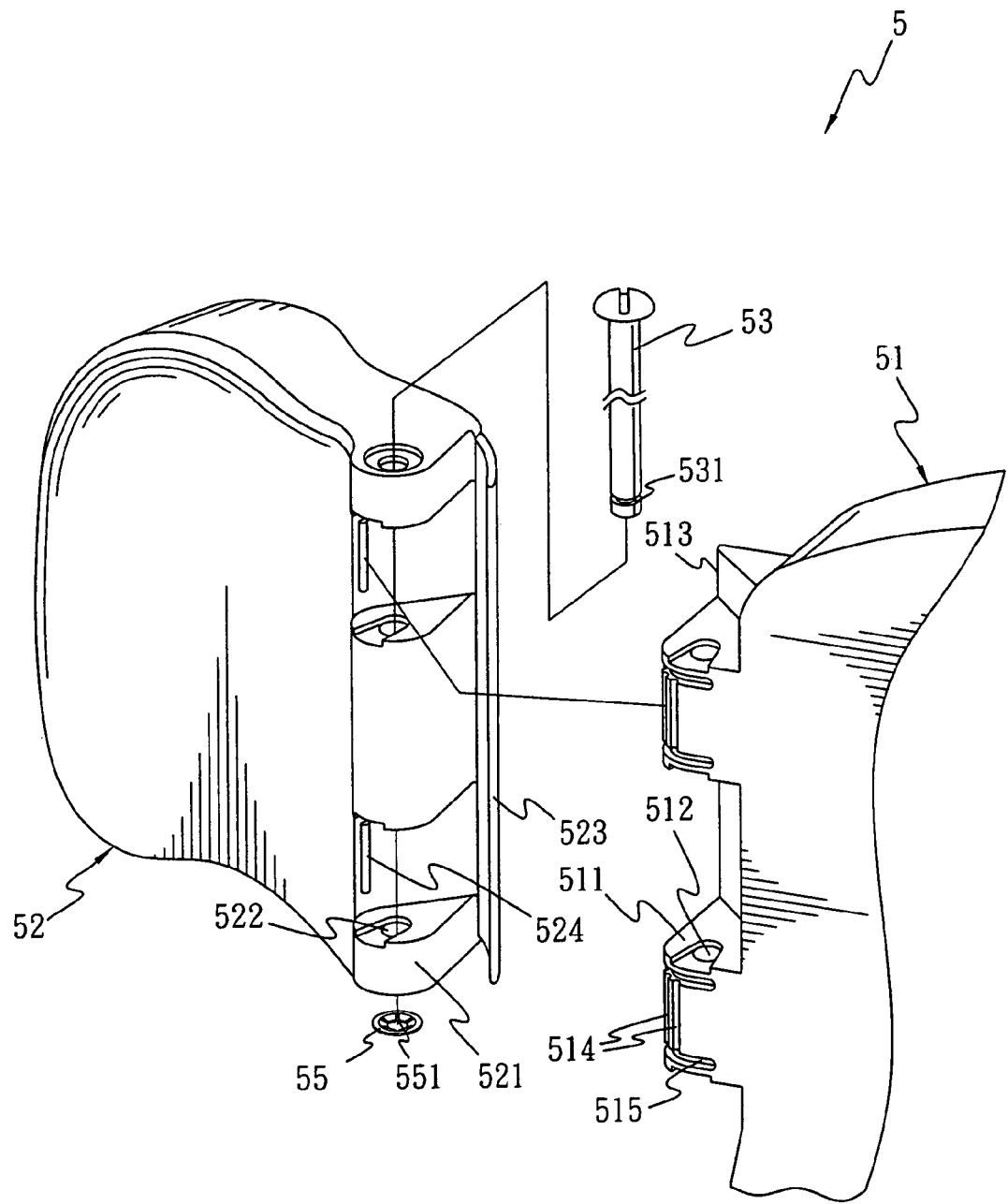
FIG. 3 is an exploded perspective view illustrating the first preferred embodiment of the headrest assembly in the child car seat device with wing components according the present application.

As shown in FIG. 3, the headrest assembly 5 includes a plate-shaped headrest body 51, two headrest wing components 52, two first pivots 53, and two first fasteners 55.

The headrest body 51 respectively at two sides thereof has two spaced first pivoting blocks 511, two first holes 512 longitudinally formed through each of the first pivoting blocks 511 respectively, a first stopper 513 located near the back side of the first pivoting blocks 511, two laterally first slots 515 respectively near the upper and lower edges of each first pivoting block 511, and a plurality of first engaging portions 514, such as three grooves, longitudinally formed on the circumferential surface of each first pivoting block 511.

Each headrest wing component 52 at one side thereof has three second pivoting blocks 521, three second holes 522 longitudinally formed through each of the second pivoting blocks 521 respectively, a first cover 523 located near the back side of the second pivoting blocks 521, and two second engaging portions 524, such as ribs, respectively formed between every two adjacent second pivoting blocks 521.

Each first pivot 53 has a first recess 531 on the distal end thereof. Each first fastener 55, such as a washer with claws, has a plurality of first claws 551 which inwardly extend.

Figure 4:
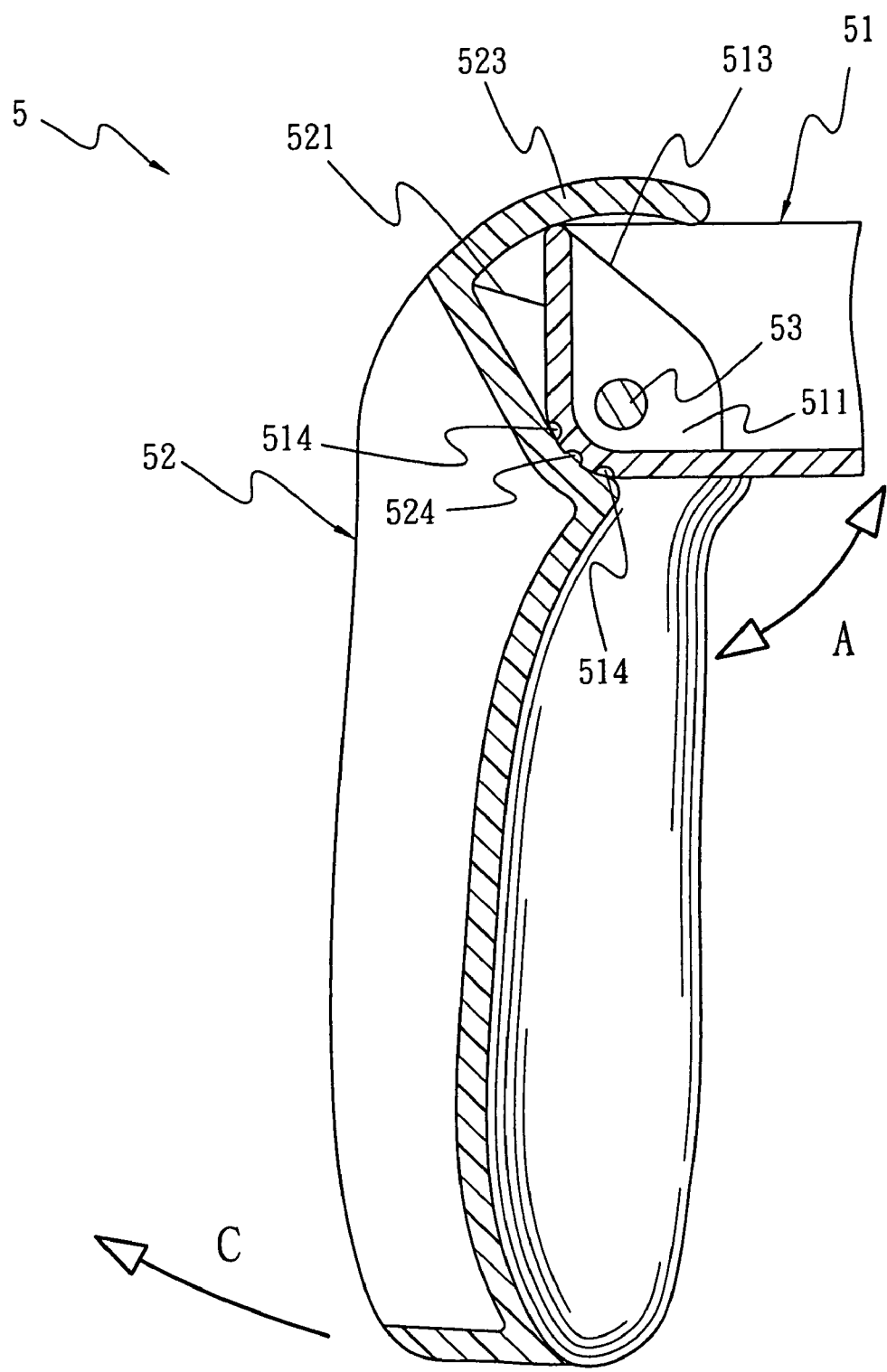
FIG. 4 is a sectional view taken from the line IV-IV in the FIG. 2 and illustrating the state that the headrest wing component is adjusted to the smallest angle relative to the headrest body component.
Figure 5:
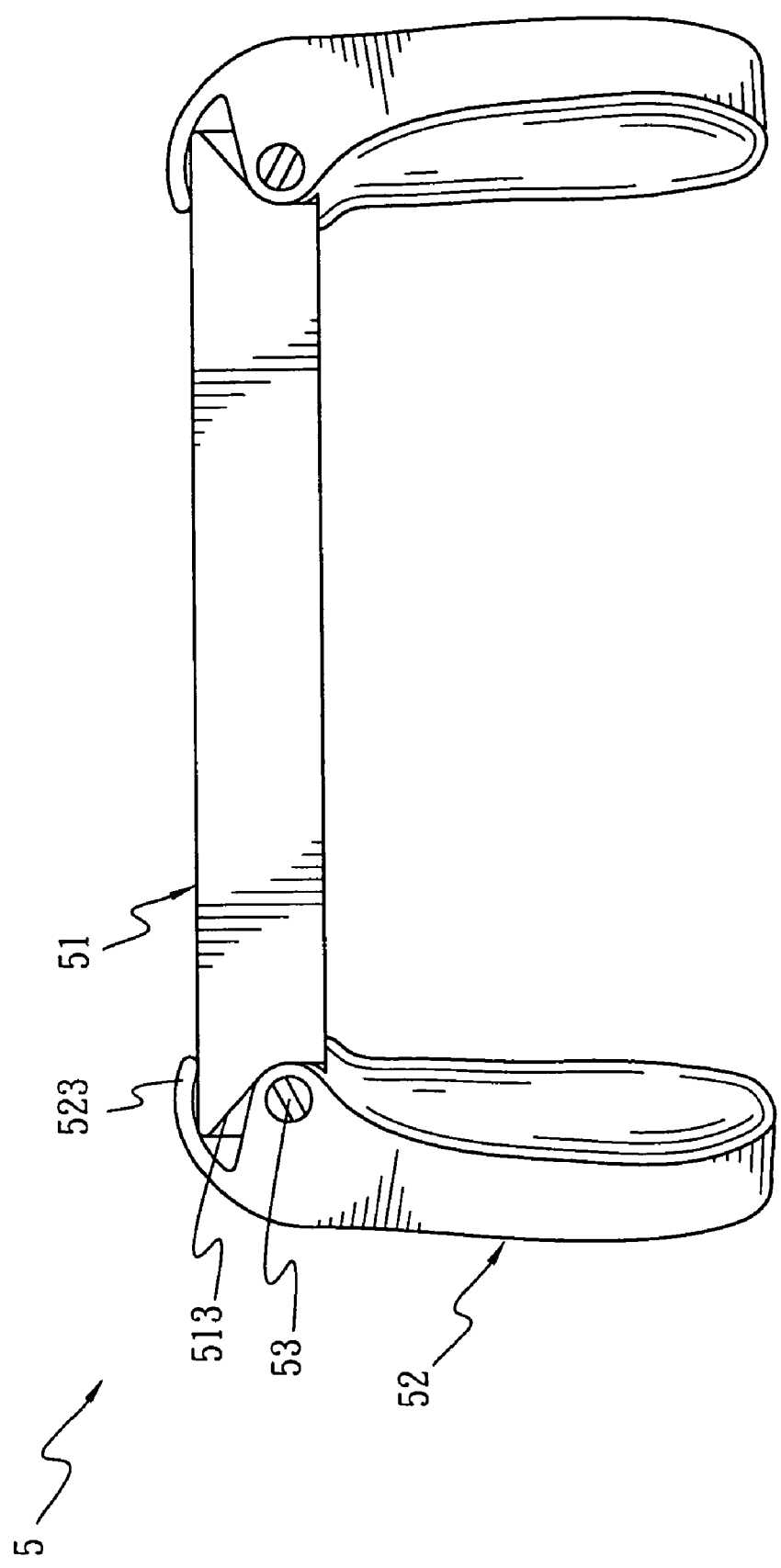
FIG. 5 is a top view illustrating that the headrest assembly is in the state shown in the FIG. 4.

As shown in FIGS. 3, 4 and 5, when the second pivoting blocks 521 are alternately coupled with the first pivoting blocks 511 to the extent that the second holes 522 are aligned with the first holes 512 and the second engaging portion 524 is received in one of the first engaging portions 514, the first pivot 53 is inserted into the second holes 522 and the first holes 512. Then, the first claws 551 are engaged into the first recess 531 which is revealed outside the second pivoting block 521 such that the headrest wing component 52 and the headrest body 51 are pivotally connected together. In addition, the headrest wing component 52 and the headrest body 51 corporately define a first angle "A" therebetween.

As shown in FIGS. 4 and 5, when a force is applied to the headrest wing component 52 along the arrow "C", because the first engaging portions (such as the grooves) 514 are formed on the sidewall of the first pivoting block 511 between the two first slots 515, thus the sidewall of the first pivoting block 511 can be resiliently deformed by the second engaging portion (such as the rib) 524 to allow the second engaging portion 524 snapping into or out of the first engaging portions 514. Therefore, by selectively receiving the second engaging portion 524 within one of the first engaging portions 514 which are substantially situated with the same radius of curvature, the headrest wing component 52 can be adjusted with different first angles "A" to properly support the head of the child sitting in the child car seat device 2.

Figure 6:
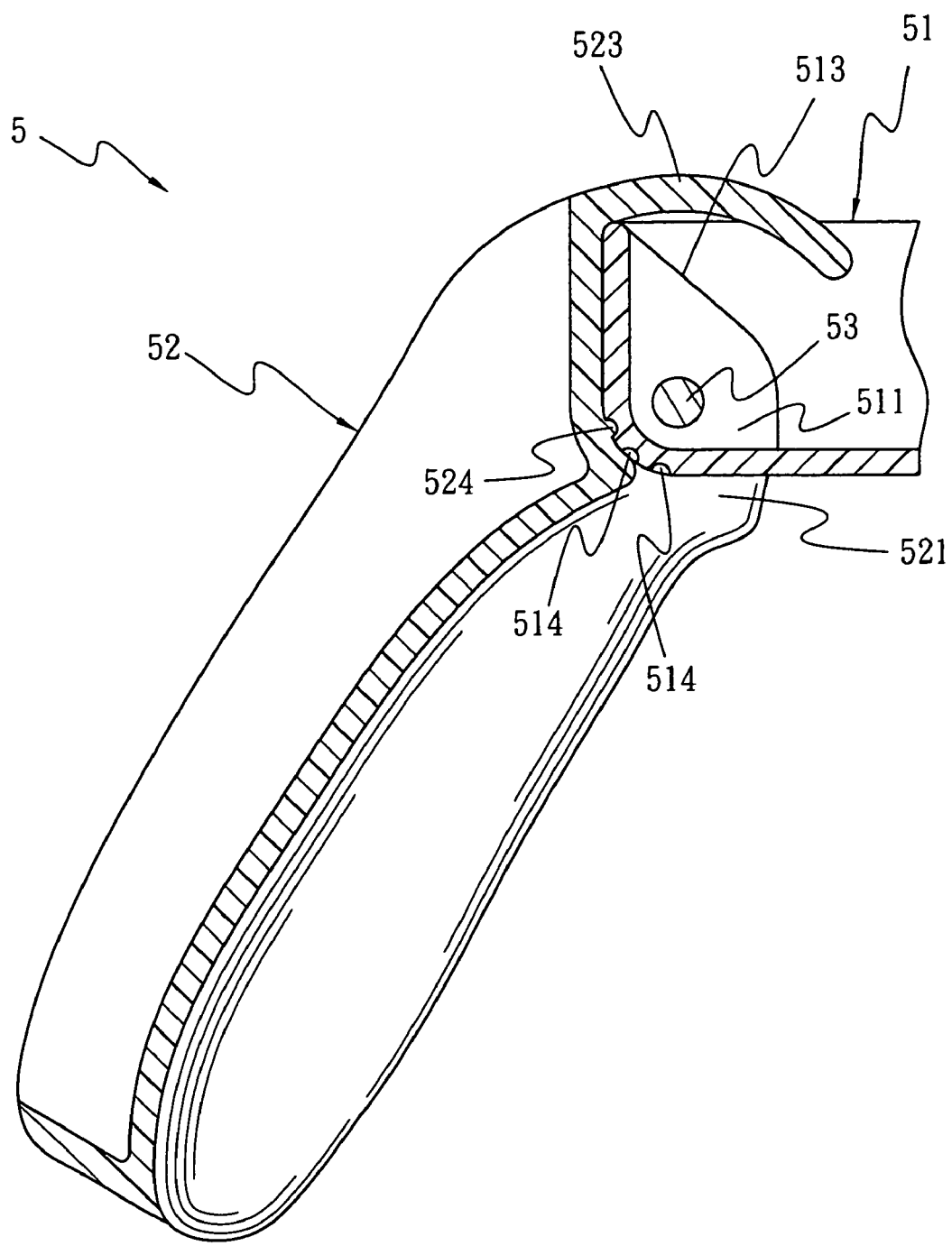
FIG. 6 is a view similar to the FIG. 4 but illustrating the state that the headrest wing component is adjusted to the largest angle relative to the headrest body component.
Figure 7:
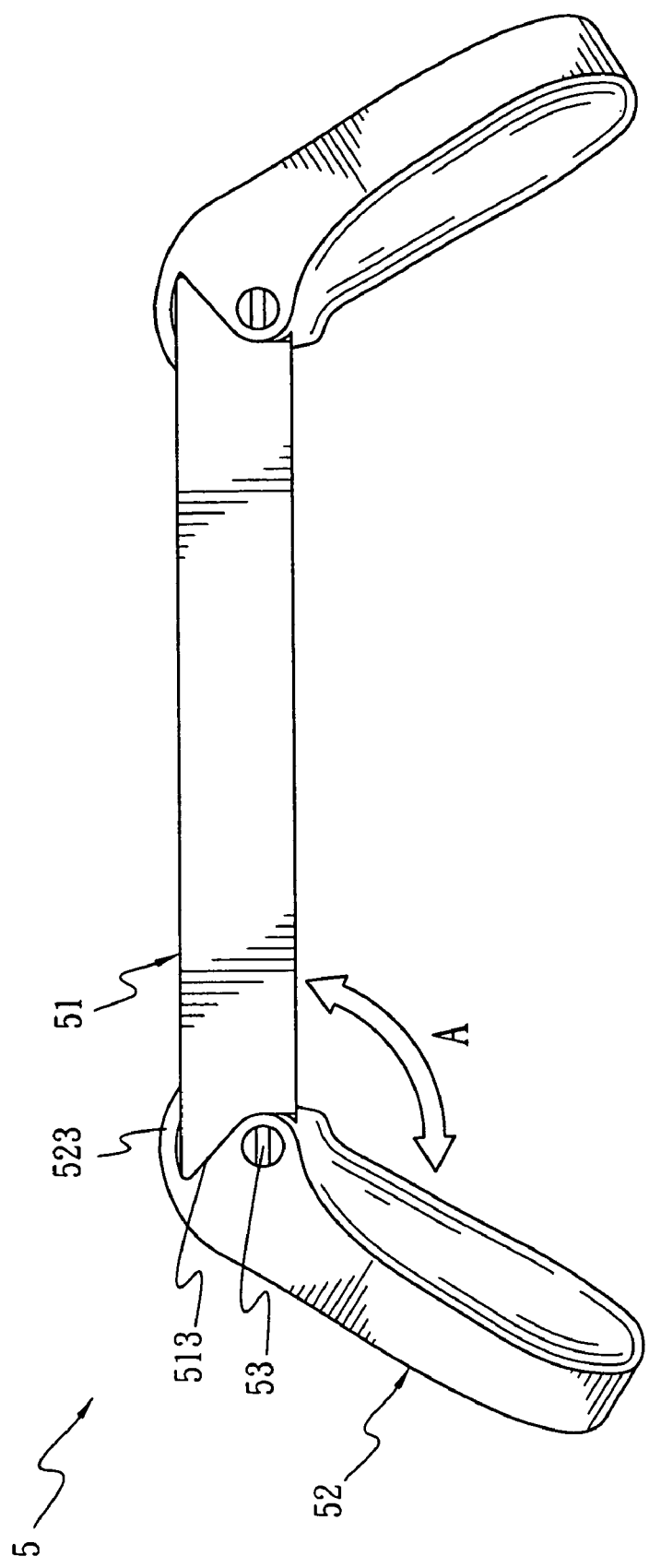
FIG. 7 is a top view illustrating that the headrest assembly is in the state shown in the FIG. 6.

As shown in FIGS. 6 and 7, when the headrest wing component 52 is pivotally rotated to the extent that the first stopper 513 abuts against the side face of the second pivoting block 521, the headrest wing component 52 cannot be further rotated outwardly. In this state shown in the FIG. 7, the first angle "A" is a maximum.

Furthermore, as shown in FIGS. 4 and 6, in the whole range of rotating the headrest wing component 52, the first cover 523 continually shields the rear gap between the headrest wing component 52 and the headrest body 51 so as to prevent the finger, which is neglectfully stretched into the gap, of the child or the user from being jammed.

In another embodiment, the first pivot 53 may be a rivet so as to omit the first fastener 55.

Backrest Assembly

Figure 8:
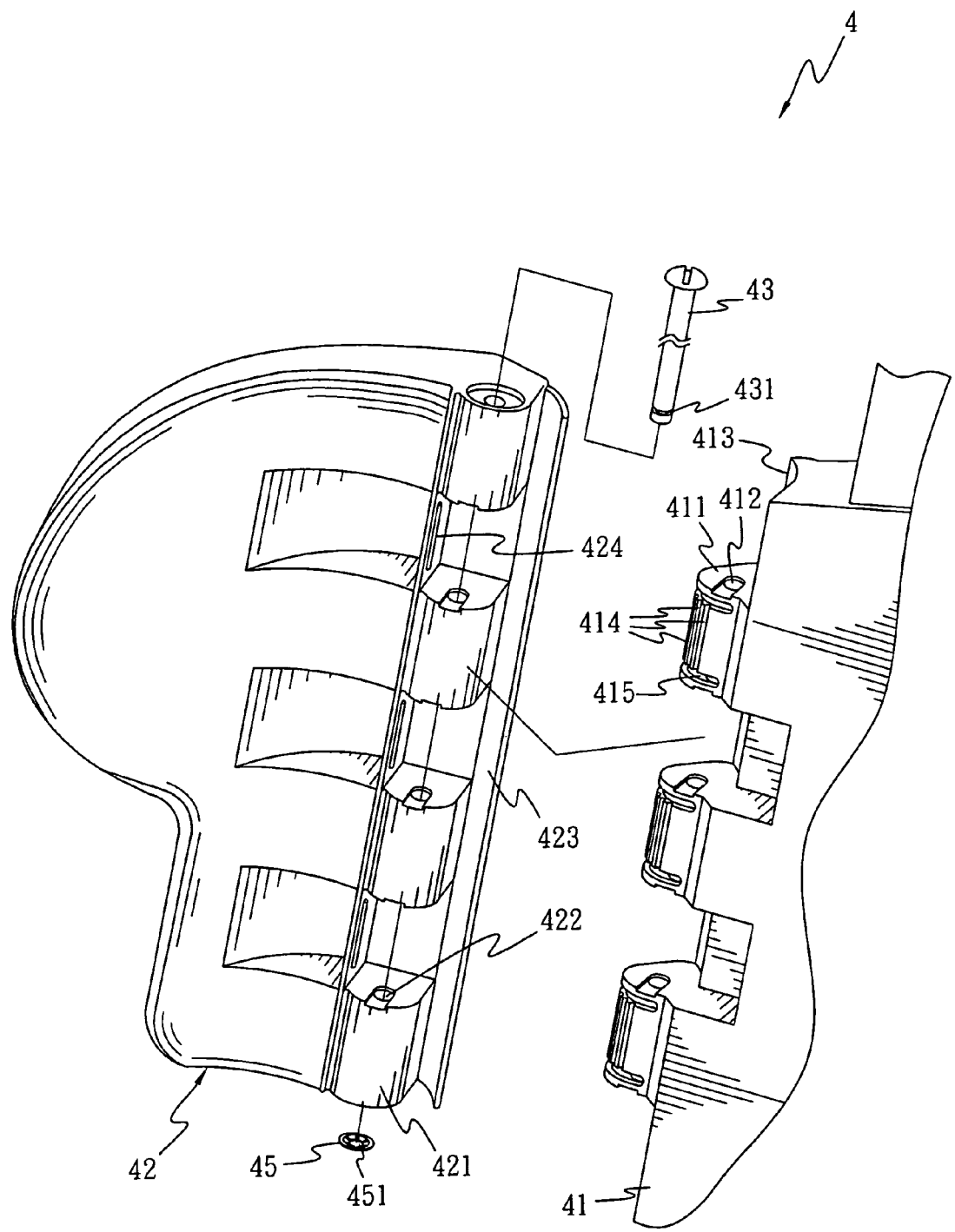
FIG. 8 is an exploded perspective view illustrating the first preferred embodiment of the backrest assembly in the child car seat device with wing components according the present application.

As shown in FIG. 8, the structures of the backrest assembly 4 are similar to those of the headrest assembly 5. The backrest assembly 4 includes a plate-shaped backrest body 41, two backrest wing components 42, two second pivots 43 and two second fasteners 45.

The backrest body 41 respectively at two sides thereof has three spaced third pivoting blocks 411, three third holes 412 longitudinally formed through each of the third pivoting blocks 411 respectively, a second stopper 413 located near the back side of the third pivoting blocks 411, two laterally second slots 415 respectively near the upper and lower edges of each third pivoting block 411, and a plurality of third engaging portions 414, such as three grooves, longitudinally formed on the circumferential surface of each third pivoting block 411.

Each backrest wing component 42 at one side thereof has four fourth pivoting block 421, four fourth holes 422 longitudinally formed through each of the fourth pivoting blocks 421 respectively, a second cover 423 located near the back side of the fourth pivoting blocks 421, and three fourth engaging portions 424, such as ribs, respectively formed between every two adjacent fourth pivoting blocks 421.

Figure 9:
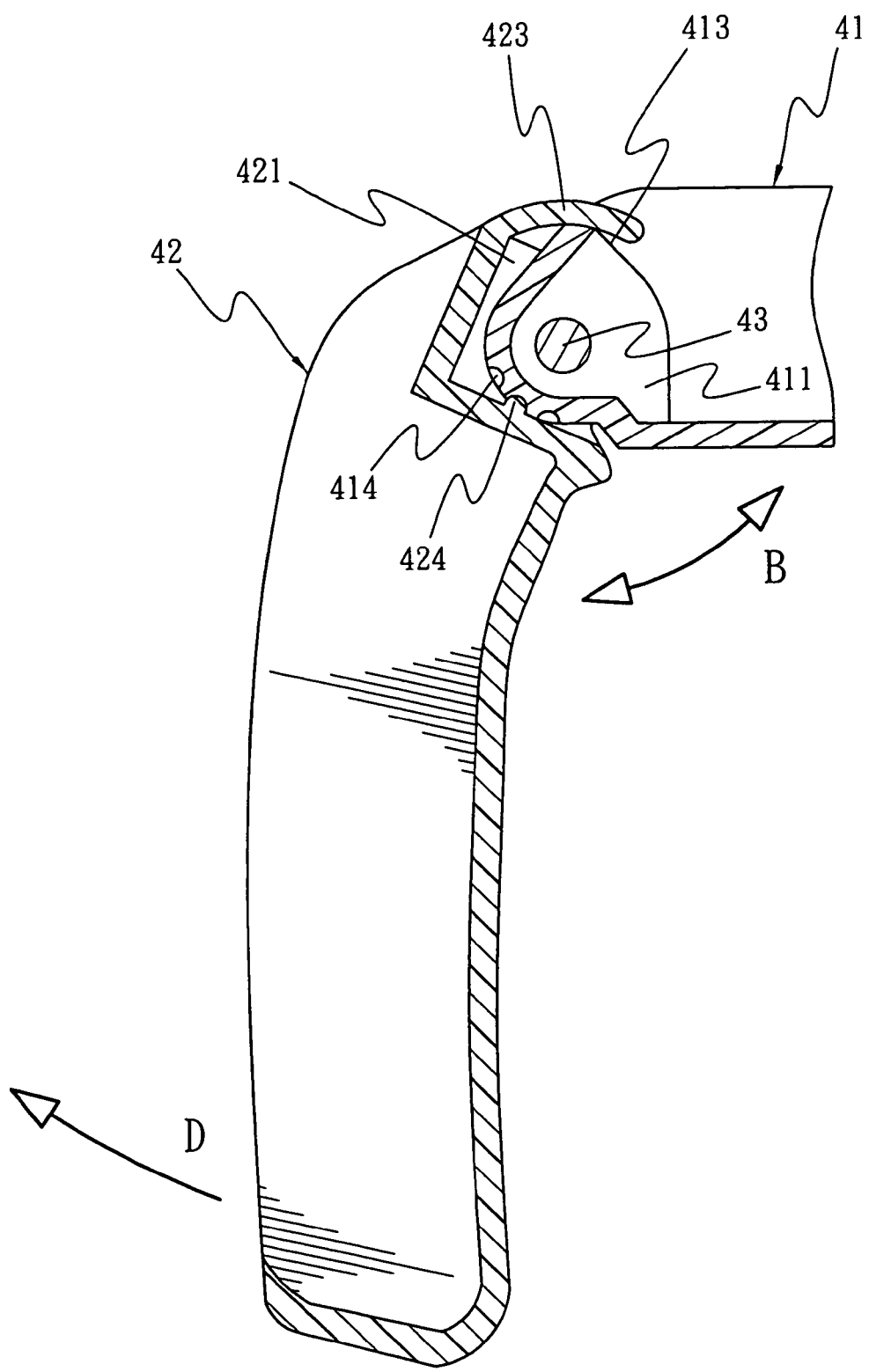
FIG. 9 is a sectional view taken from the line IX-IX in the FIG. 2 and illustrating the state that the backrest wing component is adjusted to the smallest angle relative to the backrest body component.

As shown in FIGS. 8 and 9, when the fourth pivoting blocks 421 are alternately coupled with the third pivoting blocks 411 to the extent that the fourth holes 422 are aligned with the third holes 412 and the fourth engaging portion 424 is received in one of the third engaging portions 414, the second pivot 43 is inserted into the fourth holes 422 and the third holes 412. Then, the second claws 451 are engaged into the second recess 431 which is revealed outside the fourth pivoting block 421 such that the backrest wing component 42 and the backrest body 41 are pivotally connected together. In addition, the backrest wing component 42 and the backrest body 41 corporately define a second angle "B" therebetween.

Figure 10:
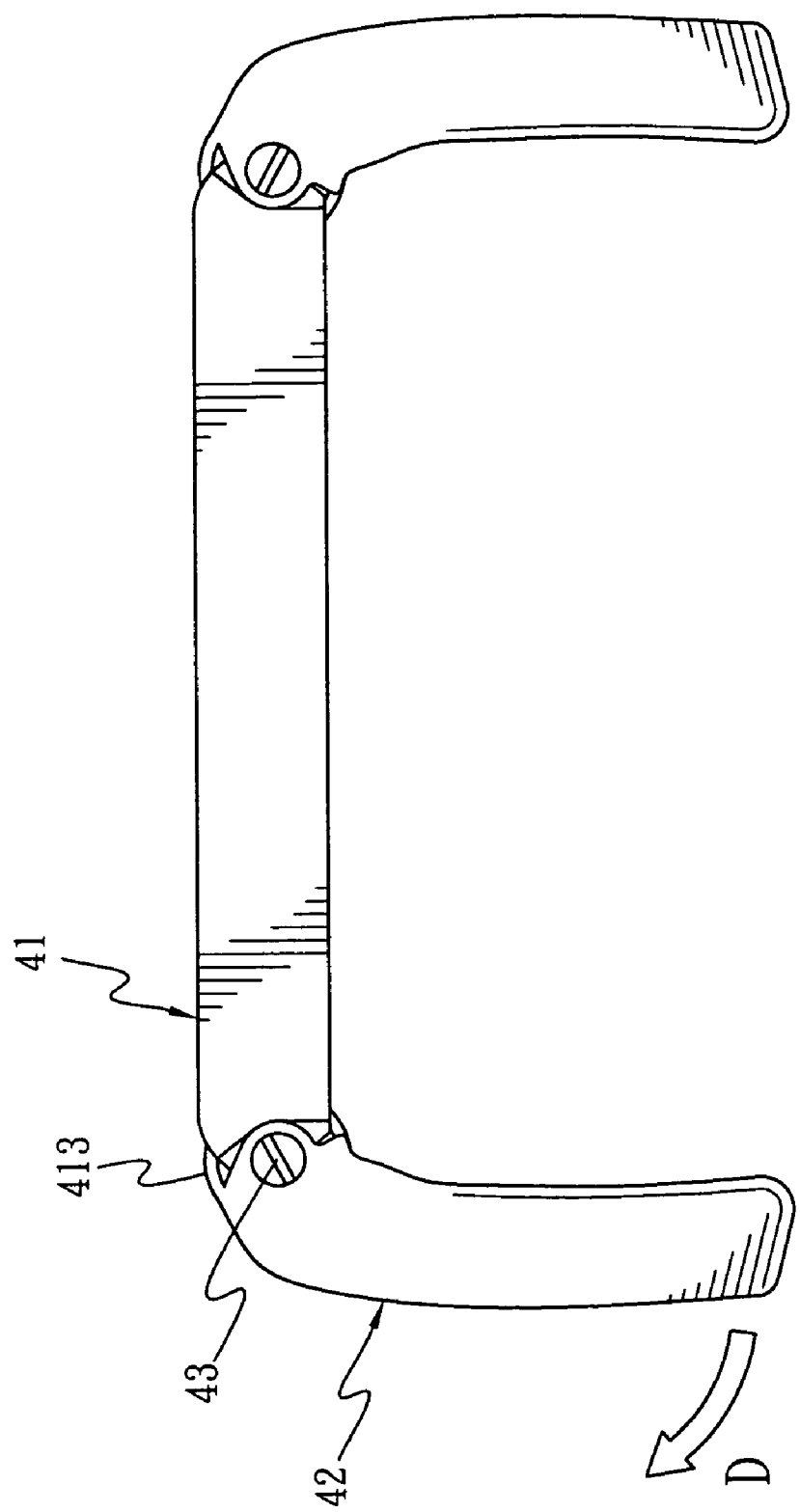
FIG. 10 is a top view illustrating that the backrest assembly is in the state shown in the FIG. 9.

As shown in FIGS. 9 and 10, when a force is applied to the backrest wing component 42 along the arrow "D", because the third engaging portions (such as the grooves) 414 are formed on the sidewall of the third pivoting block 411 between two second slots 415, thus the sidewall of the third pivoting block 411 can be resiliently deformed by the fourth engaging portion (such as the rib) 424 to allow the fourth engaging portion 424 snapping into or out of the third engaging portions 414. Therefore, by selectively receiving the fourth engaging portion 424 within one of the third engaging portions 414 which are substantially situated with the same radius of curvature, the backrest wing component 42 can be adjusted with different second angles "B" to properly support the body of the child sitting in the child car seat device 2.

Figure 11:
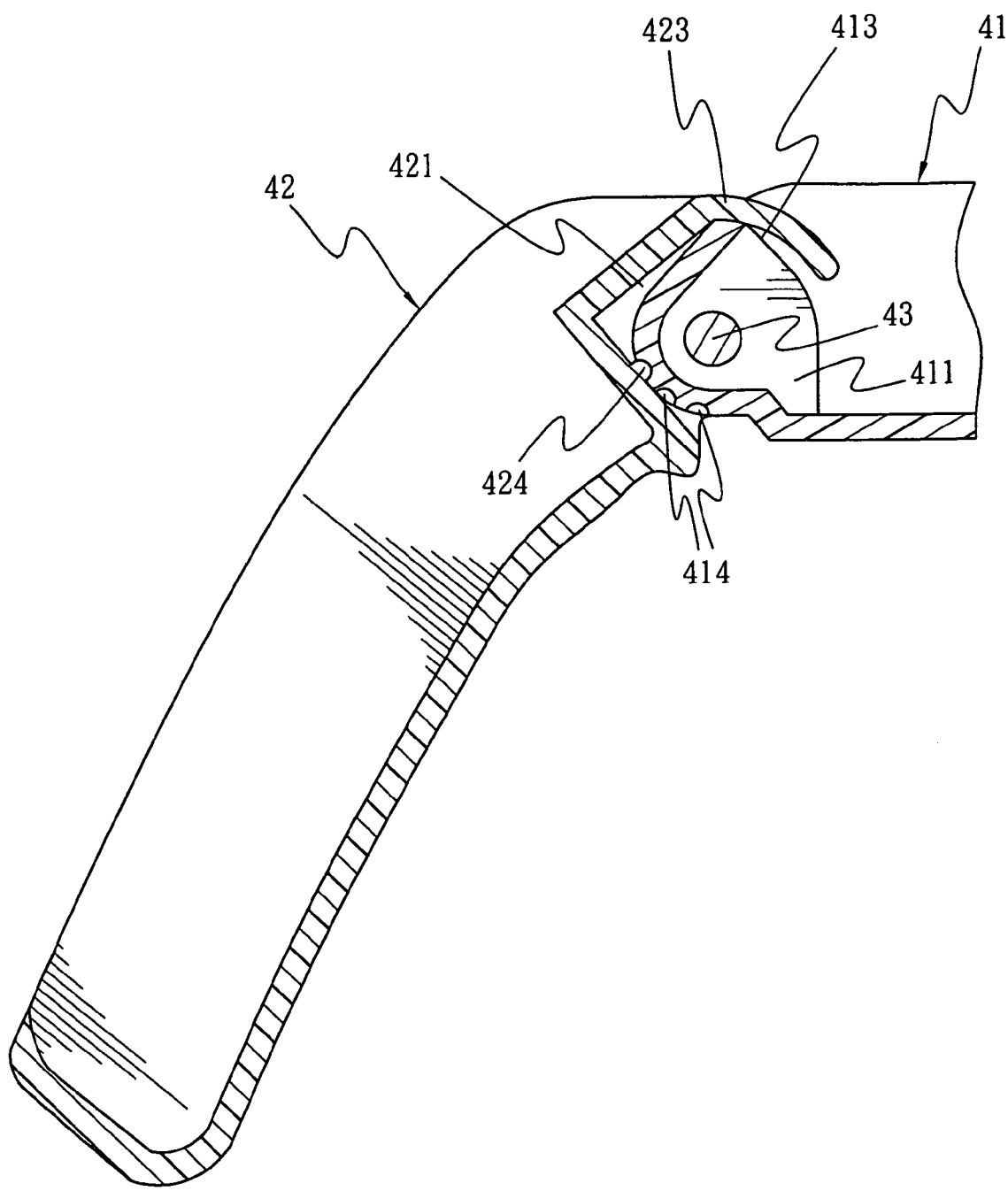
FIG. 11 is a view similar to the FIG. 9 but illustrating the state that the backrest wing component is adjusted to the largest angle relative to the backrest body component.
Figure 12:
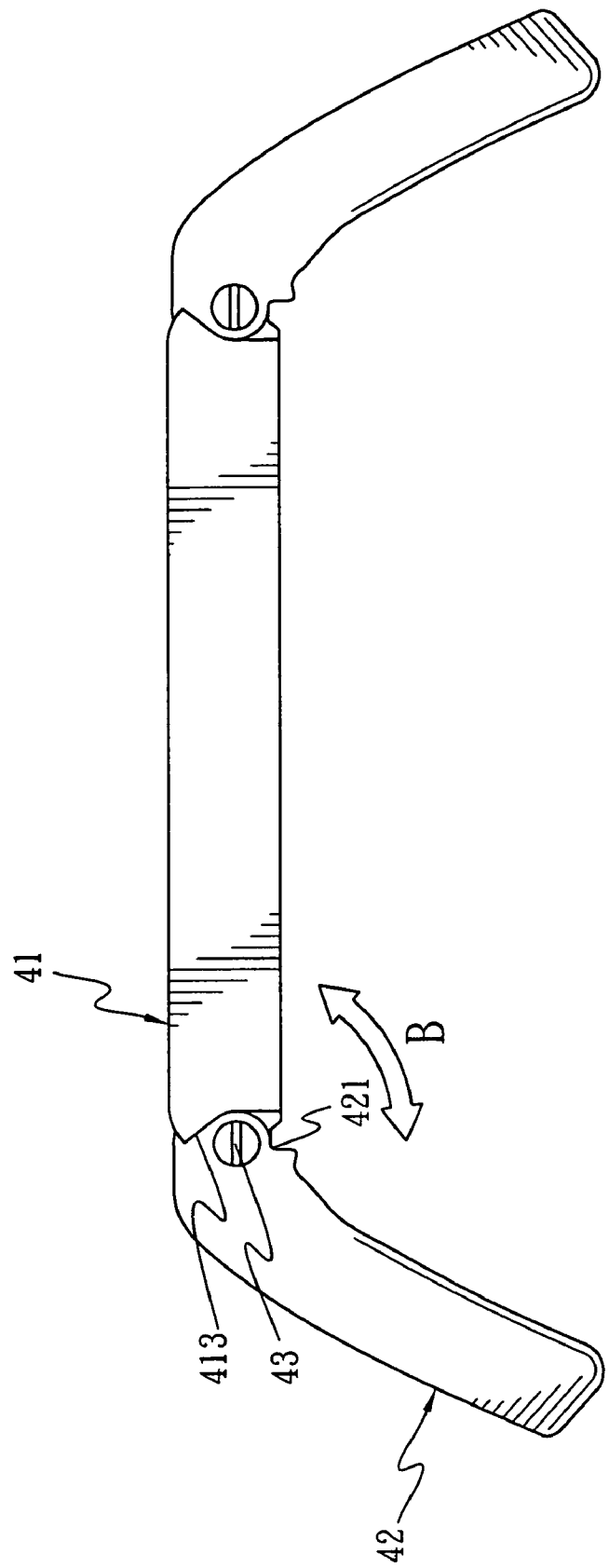
FIG. 12 is a top view illustrating that the backrest assembly is in the state shown in the FIG. 11.

As shown in FIGS. 11 and 12, when the backrest wing component 42 is pivotally rotated to the extent that the third stopper 413 abuts against the side face of the fourth pivoting block 421, the backrest wing component 42 cannot be further rotated outwardly. In this state shown in the FIG. 12, the second angle "B" is a maximum.

Furthermore, as shown in FIGS. 9 and 11, in the whole range of rotating the backrest wing component 42, the second cover 423 continually shields the rear gap between the backrest wing component 42 and the backrest body 41 so as to prevent the finger, which is neglectfully stretched into the gap, of the child or the user from being jammed.

In another embodiment, the second pivot 43 may be a rivet so as to omit the second fastener 45.

In above preferred embodiments, the child car seat device 2 includes both headrest wing components 52 and backrest wing components 42. However, in other preferred embodiments, the child car seat device 2 may include only headrest wing components 52 without backrest wing components 42, and vice versa.

The Second Preferred Embodiment

The main differences between the second and the first preferred embodiments of the child car seat devices reside in that the second preferred embodiment additionally includes an inclined tab situated on the inner surface of one of the pivoting blocks in each wing component and an opening formed on the top surface of that pivoting block. Besides, in the second preferred embodiment, the number of the pivoting blocks is reduced and there is no recess in the pivot. Therefore, only above differences will be described hereinafter while the description on the same or similar structures will be omitted.

Backrest Assembly

Figure 13:
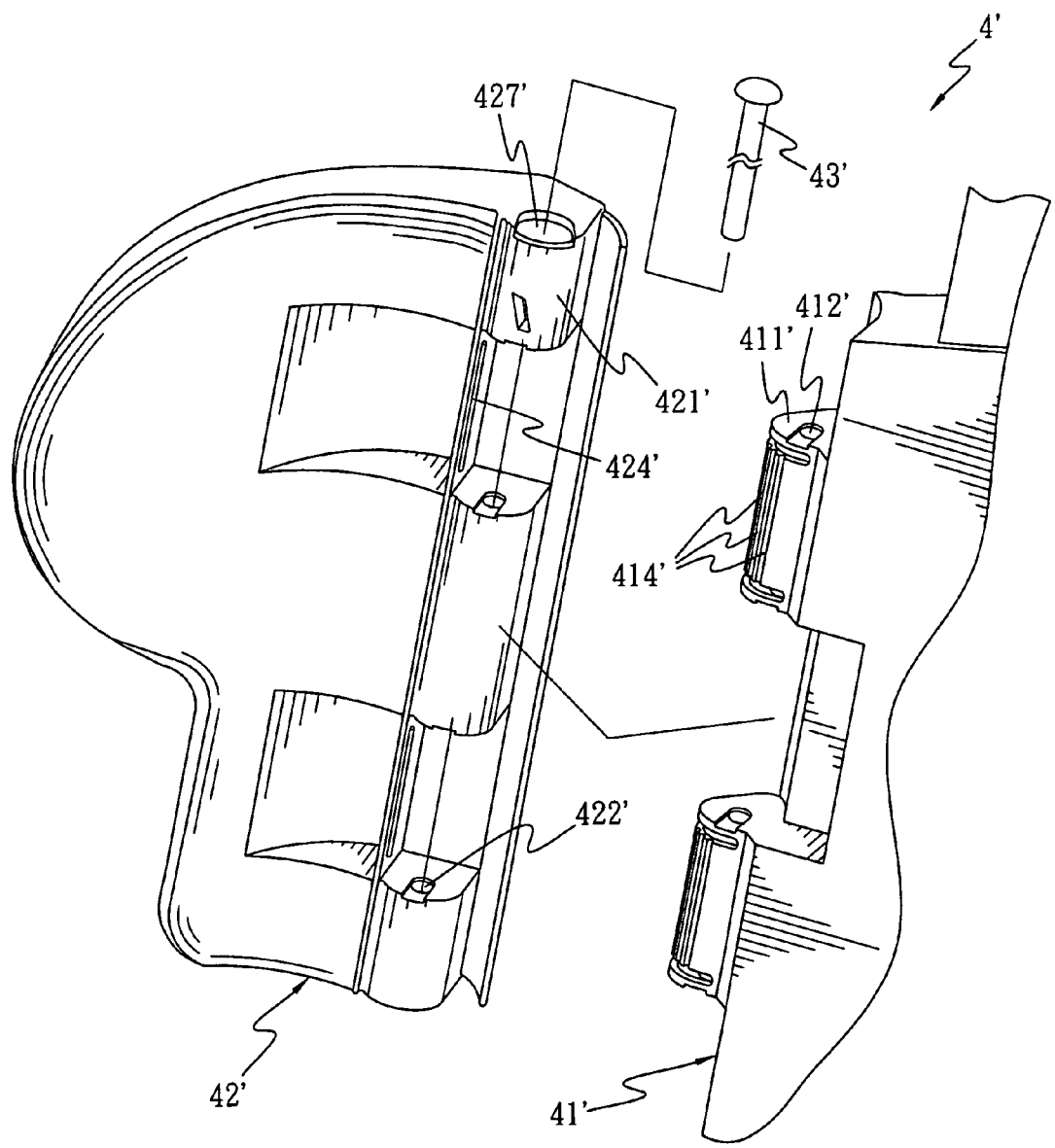
FIG. 13 is an exploded perspective view illustrating the second preferred embodiment of the backrest assembly in the child car seat device with wing components according the present application.
Figure 14:
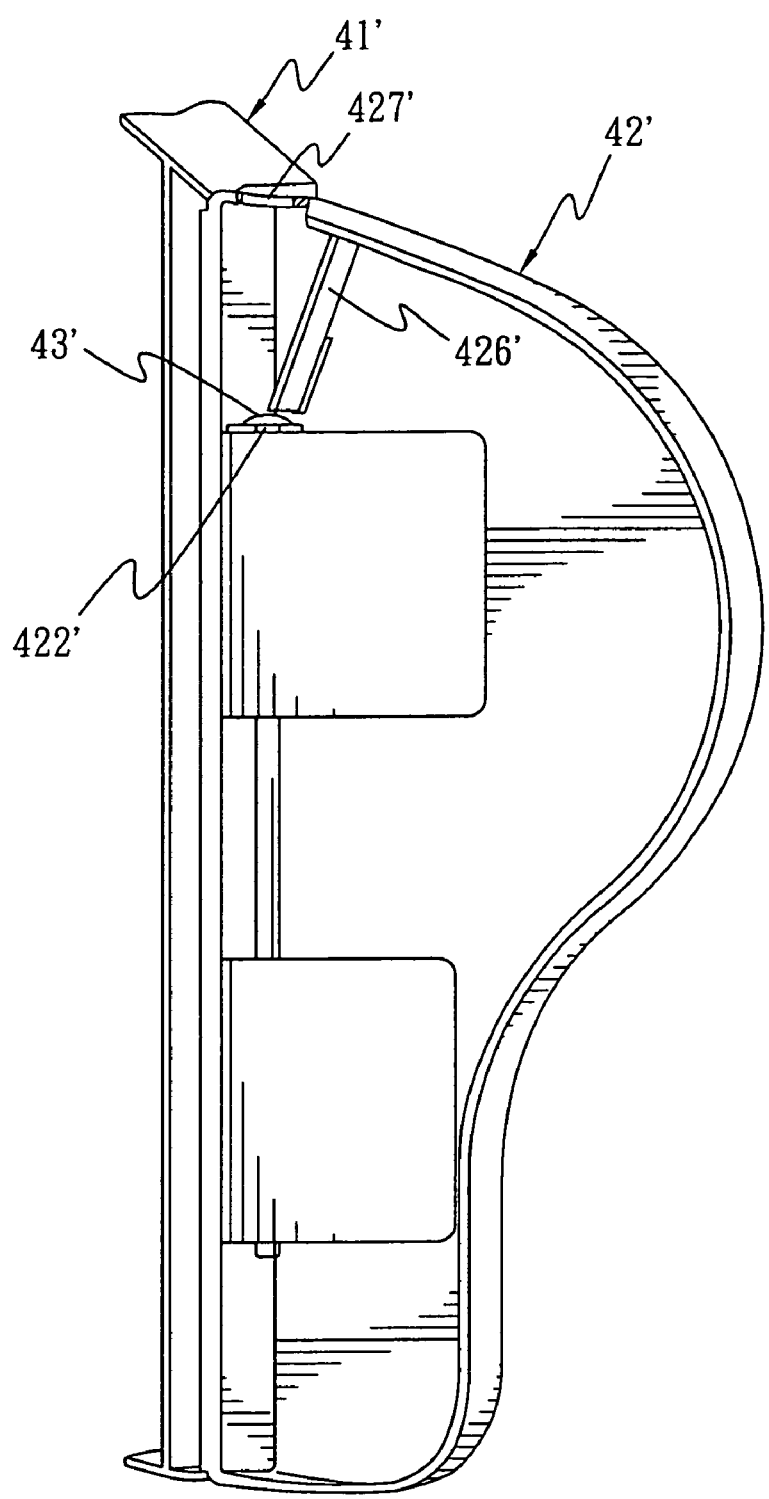
FIG. 14 is a perspective view illustrating the rear side of backrest wing component shown in the FIG. 13.

As shown in FIGS. 13 and 14, the backrest wing component 42' in the second preferred embodiment includes three spaced fourth pivoting block 421', a second opening 427' formed on the top surface of the upper fourth pivoting block 421' with a diameter larger than that of the second pivot 43', and a second tab 426' which extends away from the inner surface of the upper fourth pivoting block 421' and inclines with the axis of the fourth hole 422'. Furthermore, only the upper section of the second tab 426' is connected with the inner surface of the upper fourth pivoting block 421' while the lower section of the second tab 426' is separated from the inner surface of the upper fourth pivoting block 421'. Besides, when seen downwardly from the top of backrest wing component 42', the lower end of the second tab 426' is adjacent to or contact with the circumference of the fourth hole 422'.

Figure 15:
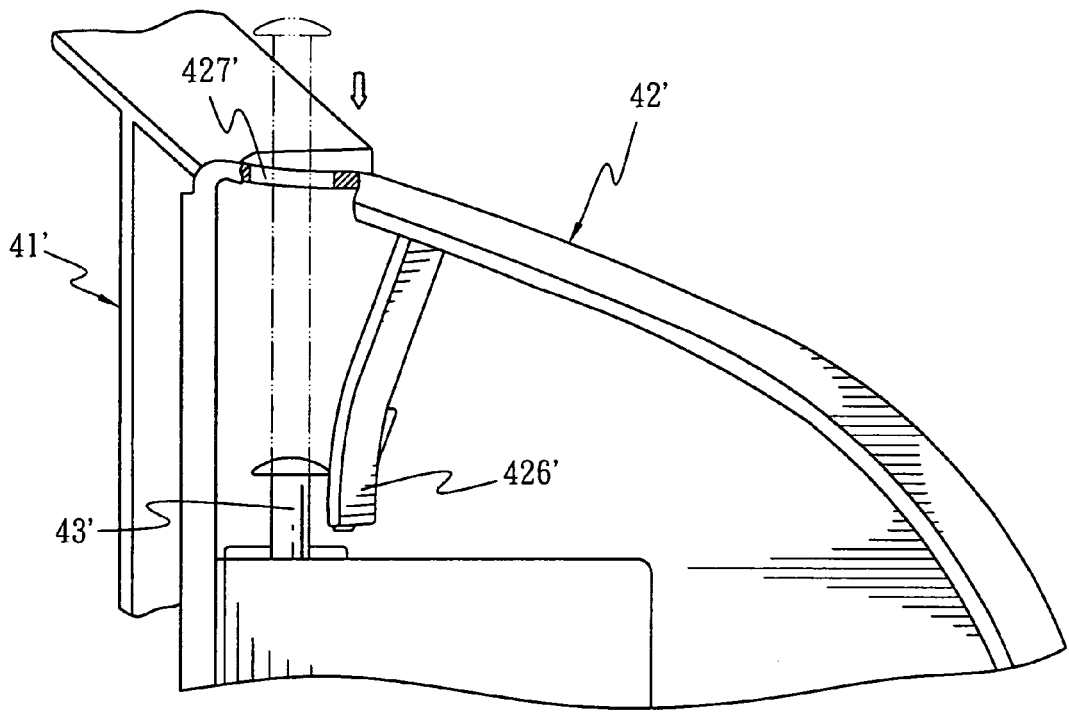
FIG. 15 is a perspective view illustrating that the second pivot in the second preferred embodiment of the child car seat device with wing components according the present application is being mounted.
Figure 16:
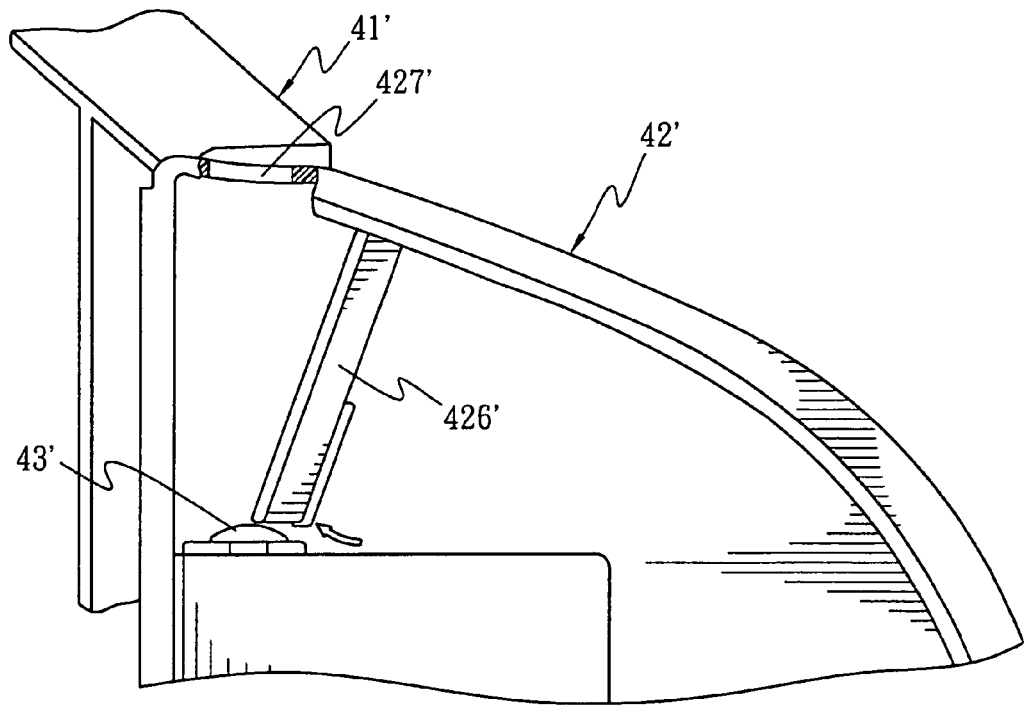
FIG. 16 is a view similar to FIG. 15 but illustrating that the second pivot has been completely mounted.
Figure 17:
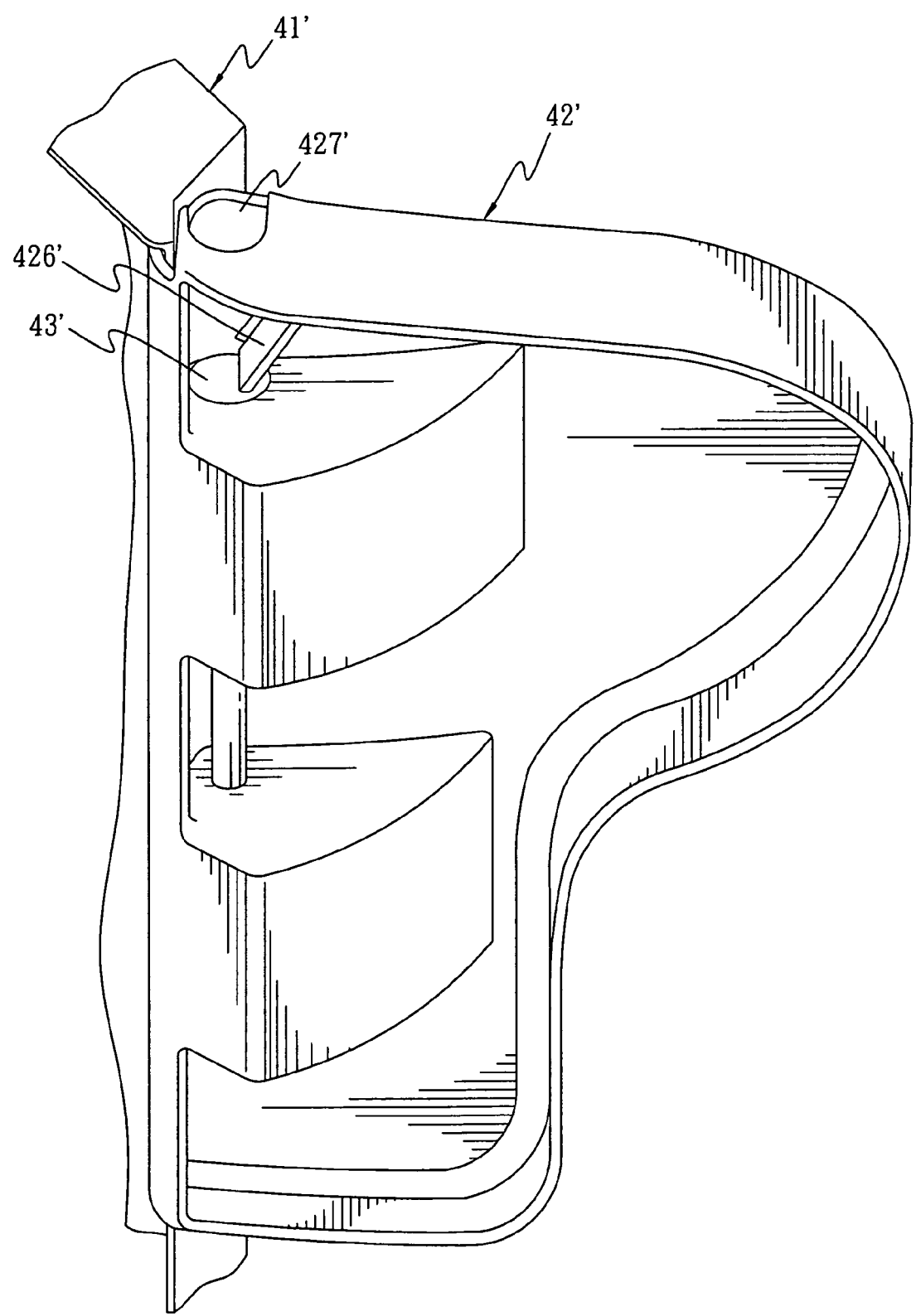
FIG. 17 is a view similar to FIG. 16 but being observed from the bottom.

Correspondingly, the backrest body 41' only includes two spaced third pivoting blocks 411'. The two third pivoting blocks 411' will be alternatively coupled with the three fourth pivoting blocks 421' and then the second pivot 43' is inserted through the second opening 427', the third holes 412' and the fourth holes 422'. As shown in FIG. 15, in the process of mounting the second pivot 43', the head of the second pivot 43' will interfere with the lower end of the second tab 426' and deform resiliently the lower section. As shown in FIG. 16, after the head of the second pivot 43' is moved below the lower end of the second tab 426', the lower section of the second tab 426' will spring back and then retain the second pivot 43' in the third and fourth holes 412', 422' as shown in FIG. 17.

In this second preferred embodiment, since the second pivot 43' is retained at its upper end, then there is no need to mount the second fastener 45 similar to that in the first preferred embodiment to the second pivot 43' at its lower end. Consequently, there is no need to form the fourth hole 422' on the bottom surface of the lower fourth pivoting block 421'. In addition, because there is no second fastener 45 to be amounted, the second pivot 43', backrest wing component 42' and backrest body 41' can be easily mounted together without using the mounting tool. Moreover, due to the reduced number of pivoting blocks 411', 421' and the shortened second pivot 43', the mounting work will be easily completed because the number of the holes to be aligned with is fewer.

Headrest Assembly

Figure 18:
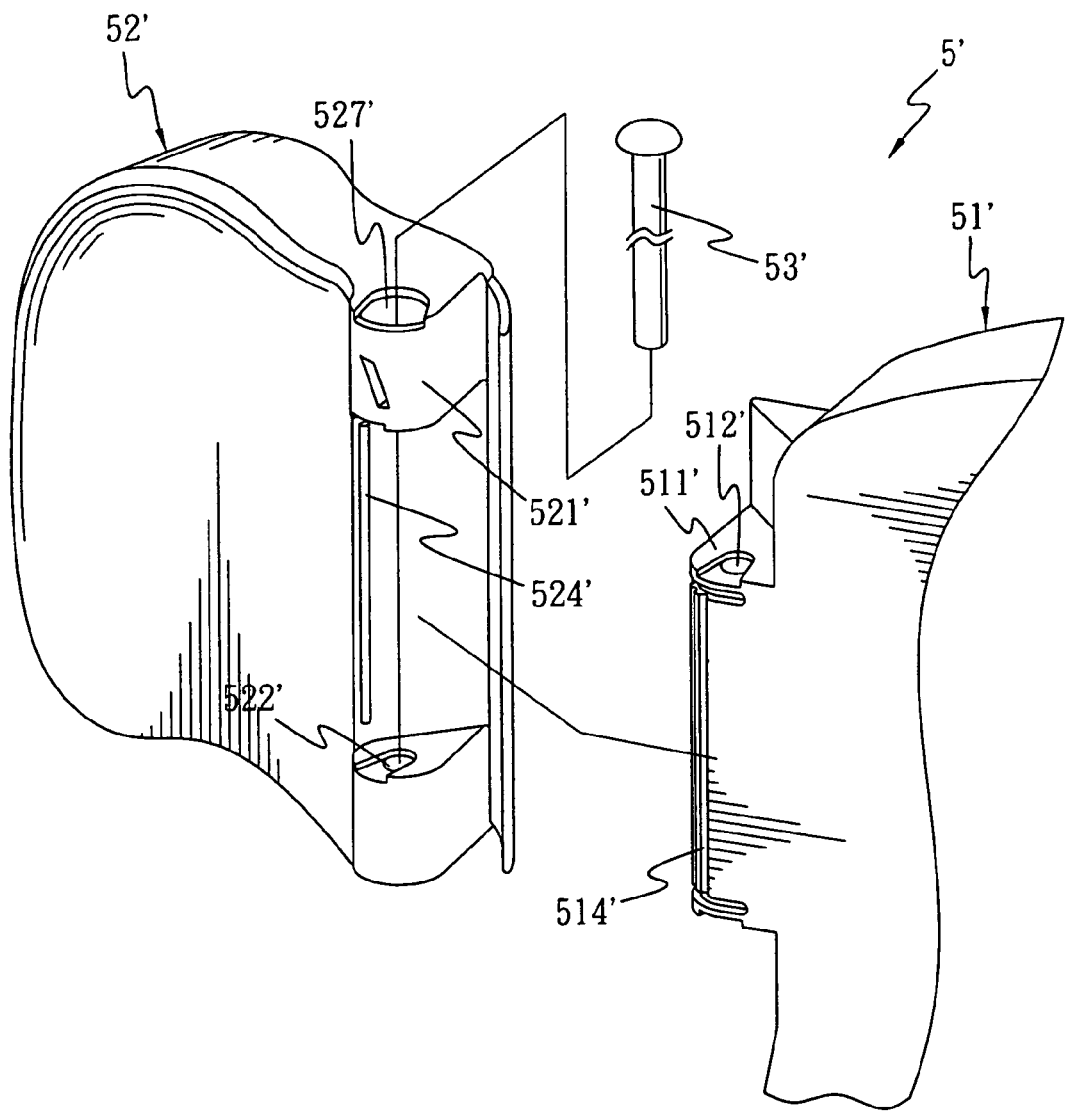
FIG. 18 is an exploded perspective view illustrating the second preferred embodiment of the headrest assembly in the child car seat device with wing components according the present application.
Figure 19:
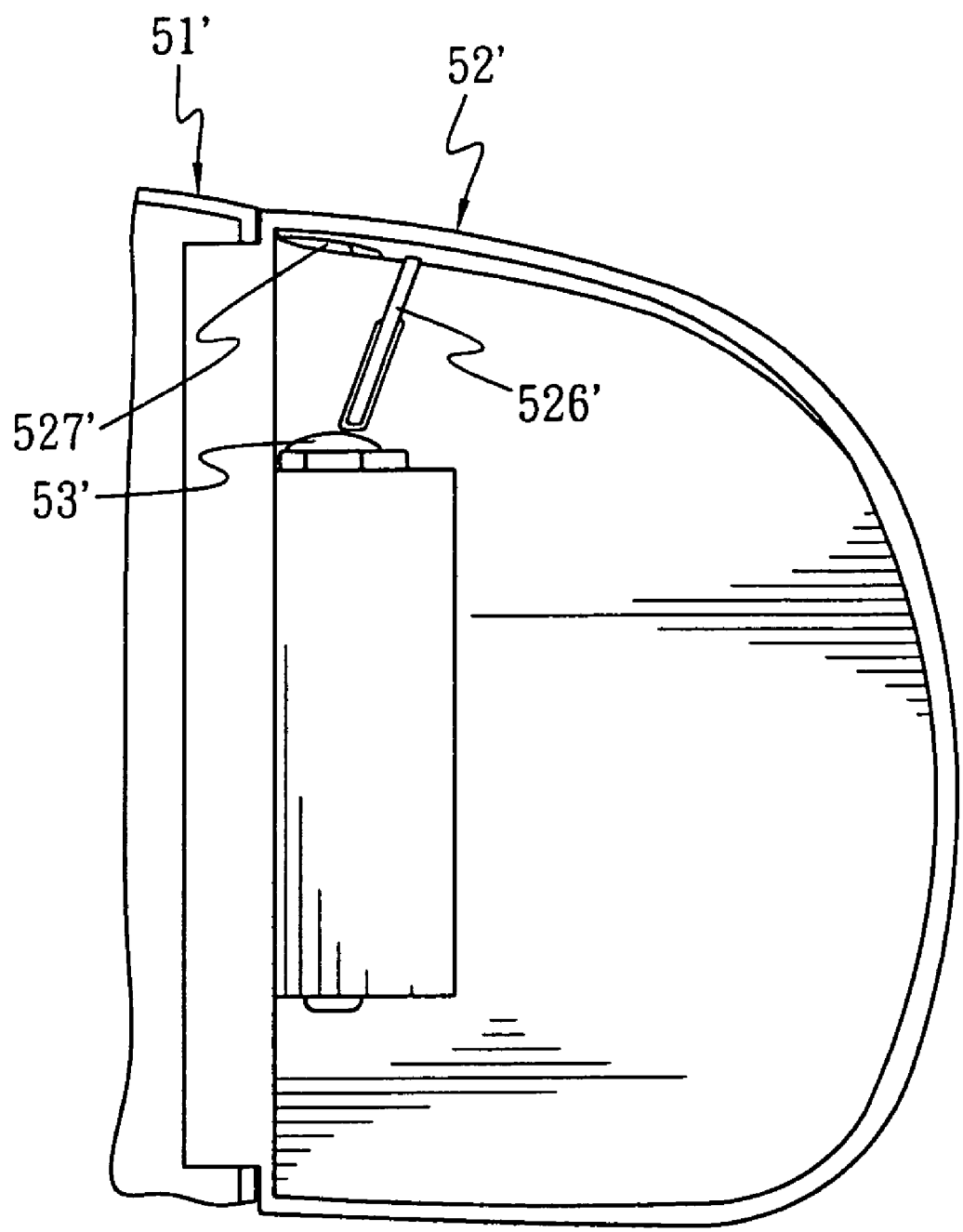
FIG. 19 is a perspective view illustrating the rear side of headrest wing component showing in the FIG. 18.

As shown in FIGS. 18 and 19, the headrest wing component 52' in the second preferred embodiment includes two spaced second pivoting block 521', a first opening 527' formed on the top surface of the upper second pivoting block 521' with a diameter larger than that of the first pivot 53', and a first tab 526' which extends away from the inner surface of the upper second pivoting block 521' and inclines with the axis of the second hole 522'. Furthermore, only the upper section of the first tab 526' is connected with the inner surface of the upper second pivoting block 521' while the lower section of the first tab 526' is separated from the inner surface of the upper second pivoting block 521'. Besides, when seen downwardly from the top of headrest wing component 52', the lower end of the first tab 526' is adjacent to or contact with the circumference of the second hole 522'.

Correspondingly, the headrest body 51' only includes one first pivoting block 511'. The first pivoting block 511' will be accommodated between two second pivoting block 521' and then the first pivot 53' is inserted through the first opening 527', the first hole 512' and the second hole 522'. In the process of mounting the first pivot 53', the head of the first pivot 53' will interfere with the lower end of the first tab 526' and deform resiliently the lower section. After the head of the first pivot 53' is moved below the lower end of the first tab 526', the lower section of the first tab 526' will spring back and then retain the first pivot 53' in the first and second holes 512', 522'.

In this second preferred embodiment, since the first pivot 53' is retained at its upper end by the first tab 526', thus there is no need to mount the first fastener 55 similar to that in the first preferred embodiment to the first pivot 53' at its lower end. Consequently, there is no need to form the second hole 522' on the bottom surface of the lower second pivoting block 521'. In addition, because there is no second fastener 45 to be amounted, thus the first pivot 53', headrest wing component 52' and headrest body 51' can be easily mounted together without using the mounting tool. Moreover, due to the reduced number of pivoting blocks 511', 521' and the shortened first pivot 53', the mounting work will be easily completed because the number of the holes to be aligned with is fewer.

This invention has been disclosed in terms of specific embodiments. It will be apparent that many modifications can be made to the disclosed structures without departing from the invention. Therefore, it is the intent of the appended claims to cover all such variations and modifications that are within the breadth and scope of this invention.

What is claimed is:

1. A seat device comprising:
   a seat assembly;
   a backrest assembly connected with the seat assembly; and
   a headrest assembly connected with the backrest assembly;
   the headrest assembly including:
   a headrest body having a plurality of first engaging portions;
   a headrest wing component having a second engaging portion, the second engaging portion being engageable with the first engaging portions such that a first angle is defined between the headrest wing component and the headrest body; and
   a first pivot being received within the headrest wing component and the headrest body by which the headrest wing component and the headrest body are pivotally connected;
   wherein the first angle can be altered by selectively engaging the second engaging portion with the first engaging portions such that a first value of the first angle when the second engaging portion is engaged with a first one of the first engaging portions is different from a second value of the first angle when the second engaging portion is engaged with a second one of the first engaging portions,
   wherein the headrest body has a first pivoting block through which a first hole passes, the headrest wing component has a second pivoting block through which a second hole passes, the first pivot is received in the first hole and the second hole, the first engaging portions are a plurality of grooves on the first pivoting block, and the second engaging portion is a rib adjacent to the second pivoting block.

2. The seat device as claimed in the claim 1, wherein the headrest body further has two first slots on the first pivoting block such that an area between the first slots are resiliently deformable, and the first engaging portions are formed on the area.

3. The seat device as claimed in the claim 1, wherein the headrest wing component further has a first tab, which extends from an inner surface of the second pivoting block to a region above the second hole for retaining the first pivot.

4. The seat device as claimed in the claim 3, wherein the first tab inclines with an axis of the second hole, and a lower section of the first tab is separated from the inner surface of the second pivoting block.

5. The seat device as claimed in the claim 3, wherein the headrest wing component further has a first opening formed on a top surface of the second pivoting block, and a diameter of the first opening is larger than that of the first pivot.

6. The seat device as claimed in the claim 1, wherein the headrest assembly further includes a first fastener, the first pivot has a first recess, and the first fastener is engaged in the first recess.

7. The seat device as claimed in the claim 1, wherein the headrest body has a first stopper, and the first angle is a maximum when the first stopper contacts with the second pivoting block.

8. The seat device as claimed in the claim 1, wherein the headrest wing component further has a first cover for covering a gap defined between the headrest wing component and the headrest body.

9. The seat device as claimed in the claim 1, wherein the backrest assembly including:
   a backrest body having a plurality of third engaging portions;
   a backrest wing component having a fourth engaging portion, the fourth engaging portion being engaged with one of the third engaging portions such that a second angle is defined between the backrest wing component and the backrest body; and
   a second pivot being received within the backrest wing component and the backrest body by which the backrest wing component and the backrest body are pivotally connected;

wherein the second angle can be altered by selectively engaging the fourth engaging portion with one of the third engaging portions.

10. The seat device as claimed in the claim 9, wherein the backrest body has a third pivoting block and a third hole through the third pivoting block; the backrest wing component has a fourth pivoting block and a fourth hole through the fourth pivoting block; the second pivot is received in the third hole and the fourth hole.

11. The seat device as claimed in the claim 10, wherein the third engaging portions are a plurality of grooves on the third pivoting block, and the fourth engaging portion is a rib adjacent to the fourth pivoting block.

12. The seat device as claimed in the claim 11, wherein the backrest body further has two second slots on the third pivoting block such that an area between the second slots are resiliently deformable, and the third engaging portions are formed on the area.

13. A seat device comprising a seat assembly and a backrest assembly connected with the seat assembly, the backrest assembly including:
   a backrest body having a plurality of third engaging portions;
   a backrest wing component having a fourth engaging portion, the fourth engaging portion being engageable with the third engaging portions such that a second angle is defined between the backrest wing component and the backrest body; and
   a second pivot being received within the backrest wing component and the backrest body by which the backrest wing component and the backrest body are pivotally connected;
   wherein the second angle can be altered by selectively engaging the fourth engaging portion with the third engaging portions such that a first value of the second angle when the fourth engaging portion is engaged with a first one of the third engaging portions is different from a second value of the second angle when the fourth engaging portion is engaged with a second one of the third engaging portions,
   wherein the backrest body has a third pivoting block and a third hole through the third pivoting block, the backrest wing component has a fourth pivoting block and a fourth hole through the fourth pivoting block, the second pivot is received in the third hole and the fourth hole, the third engaging portions are a plurality of grooves on the third pivoting block, and the fourth engaging portion is a rib adjacent to the fourth pivoting block.

14. The seat device as claimed in the claim 13, wherein the backrest body further has two second slots on the third pivoting block such that an area between the second slots are resiliently deformable, and the third engaging portions are formed on the area.

15. A child car seat device comprising:
   a rest body having a plurality of first engaging portions at first and second opposing sides thereof; and
   a pair of wing components pivotally connected to the first and second sides of the rest body respectively, each of the wing components having a second engaging portion being engageable with the first engaging portions such that an angle is defined between the rest body and the each of the wing components;
   wherein the angle can be altered by engaging the second engaging portion selectively with the first engaging portions such that a first value of the angle when the second engaging portion is engaged with a first one of the first engaging portions is different from a second value of the angle when the second engaging portion is engaged with a second one of the first engaging portions,
   wherein the rest body has a first pivoting block through which a first hole passes, each wing component has a second pivoting block through which a second hole passes, a first pivot is received in the first hole and the second hole, the first engaging portions are a plurality of grooves on the first pivoting block, and the second engaging portion is a rib adjacent to the second pivoting block.

16. The child car seat device as claimed in the claim 15, wherein the rest body further has a first pivoting block at each of the first and second sides thereof on which the first engaging portions are formed, the each of the wing components further has a second pivoting block on which the second engaging portion is formed, the second pivoting block is coupled with the first pivoting block, and a pivot is received in both the first pivoting block and the second pivoting block.

* * * * *

UNITED STATES PATENT AND TRADEMARK OFFICE
CERTIFICATE OF CORRECTION

| | | |
|---|---|---|
| PATENT NO. | : 7,631,935 B2 | Page 1 of 1 |
| APPLICATION NO. | : 11/495728 | |
| DATED | : December 15, 2009 | |
| INVENTOR(S) | : Chen et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 409 days.

Signed and Sealed this

Twenty-first Day of December, 2010

David J. Kappos
*Director of the United States Patent and Trademark Office*